Patented May 6, 1941

2,240,934

UNITED STATES PATENT OFFICE 2,240,934

MANUFACTURE OF BETA-DIKETONES

Charles J. Krister, Cleveland, Ohio, assignor to E. I. du Pont de Nemours & Company, Wilmington, Del., a corporation of Delaware No Drawing. Application December 30, 1938, Serial No. 248,522

20 Claims. (Cl. 260—595)

This invention relates to the preparation of sodium enolates of beta-diketones by the condensation of a methyl monoketone and a fatty acid ester with metallic sodium and describes processes principally characterized in that the condensation is carried out at a temperature above about 25° C.

As early as 1893 Claisen (Liebig's Annalen der Chemie, vol. 277, p. 168) prepared beta-diketones by the condensation of methyl monoketones and fatty acid esters with metallic sodium or sodium ethoxide. This process has since become generally known as the Claisen condensation. As late as 1934 Sprague, Beckham, and Adkins (Journal of the American Chemical Society, vol. 56, p. 2665) employed the Claisen condensation in preparing a wide variety of beta-diketones. Sprague et al. investigated the relative effectiveness of metallic sodium and sodium ethoxide as condensing agents and pointed out a number of disadvantages for sodium as compared with sodium ethoxide.

According to these prior art teachings great care must be exercised in effecting the condensation with metallic sodium because the reaction when once started is exceedingly vigorous and may result in dangerous explosions. It has been considered necessary, therefore, to carry out the reaction in an ice bath to keep the temperature of the reaction mixture below about 15° C. and to limit the amount of reagents to relatively small quantities.

One disadvantage of this procedure lies in the fact that to initiate reaction a somewhat higher temperature is required, usually about room temperature. As a result the reaction mixture must be watched very carefully and rapidly cooled at the first sign of reaction. Unless these precautions are scrupulously observed the reaction may proceed with explosive violence. Obviously the nicety of the control required in such a process militates against any practical application, since even skilled and experienced operators would occasionally allow the reaction to become too violent. Other disadvantages of the prior art processes are directly attributable to the low temperatures required and the resulting suppression of the reaction. For example, the time required for completing the reaction is inordinately great. Thus Sprague et al. supra, recommend that the reaction mixture be agitated for two hours after the addition of the ketone and thereafter allowed to stand in the ice bath over night. Others suggest a period of standing at room temperature of 14 to 18 hours. Notwithstanding the long period required for effecting the condensation according to the prior art processes, the efficiency heretofore obtainable has not substantially exceeded 50 per cent. For example, Sprague et al., supra, in reporting some ten beta-diketones prepared with metallic sodium as a condensing agent indicate yields ranging from 25 to 65 per cent.

I have now found that the disadvantages heretofore encountered in the condensation of methyl monoketones and fatty acid esters with metallic sodium can be avoided by carrying out the condensation at a temperature above about 25° C. I have found, for example, that by limiting the amount of ketone initially added to the reaction mixture, say to less than about 10 per cent, of the total ketone required, the reaction mixture can be heated as required to initiate condensation without danger of the reaction proceeding with explosive violence. I have also found that once the reaction is initiated in this manner the balance of the ketone may be added without danger of the reaction becoming too violent even tho the reaction mixture be maintained above about 25° C. thruout. This may be done simply by regulating the rate of addition as required to prevent the reaction from becoming violent. Suitably the balance of the ketone may be added at a rate not exceeding about 25 per cent per hour, figured on the total ketone required.

While it would seem, in view of the teachings of the prior art, that the use of temperatures above 25° C. would increase the explosion hazard, I have found quite surprisingly that the opposite is the case. It appears that according to the prior art processes the rate of the reaction was so suppressed that excessive quantities of the monoketone were always present, irrespective of the rate of addition. Consequently, when the temperature was allowed to rise substantially above about 15° C. the reaction became so rapid and heat was generated so fast that very large quantities of vapors were quickly formed. I have found that this hazard is entirely avoided by maintaining the reaction temperature above about 25° C. and believe that this may be explained by the fact that at the higher temperature the reaction proceeds so rapidly that, provided the rate of addition of the monoketone is properly controlled, excessive amounts of unreacted ketone will never be present in the reaction mixture.

I have found it desirable to carry out the reaction under an inert liquid medium, such as xylene, as metallic sodium is more easily handled under these conditions. The inert liquid medium serves a further function in diluting the reaction mixture. By increasing the volume of the reaction mixture by means of an inert liquid medium the heat of reaction has less effect upon the temperature of the reaction mixture and the rate of addition of the ketone becomes less critical. The inert liquid medium not only, as a diluent, probably decreases the rate of reaction somewhat but also, by increasing the volume of the reaction mixture, increases the capacity of the latter to absorb the heat of reaction per unit rise in temperature.

According to my preferred procedure I first contact the fatty acid ester with metallic sodium under an inert liquid medium in a closed reaction vessel provided with suitable means for agitating the reaction mixture. The metallic sodium is preferably comminuted and maintained under the inert liquid medium to prevent oxidation. The air is then swept out of the reaction vessel with nitrogen or other inert gases. This precaution is taken not only to prevent oxidation of the metallic sodium but also to reduce explosion hazards; the latter in view of the hydrogen evolved during the reaction. The reaction mixture is thus prepared for the addition of the methyl monoketone, this addition being effected during agitation of the reaction mixture.

The ketone addition is made in two steps, the first of which is intended to initiate the reaction. To initiate the reaction only a small proportion of the ketone should be added, preferably not more than 10 per cent of the total ketone required. The reaction mixture is then raised to a temperature sufficient to initiate the reaction and after the reaction has begun, as may be ascertained from changes in the color of the reaction mixture or by evolution of heat, the addition of the remaining ketone is made. This last addition is effected while the reaction mixture is maintained at a temperature above about 25° C. and should be extended over a period of several hours; preferably the addition of the balance of the ketone should be made at a rate not substantially greater than about 25 per cent per hour figured on the total ketone required. After the addition of the ketone is complete the reaction mixture is then refluxed, preferably for at least about 20 minutes. The beta-diketone or its sodium enolate may then be recovered in any suitable manner.

It will be observed that the reaction is completed by refluxing the reaction mixture rather than allowing the same to stand for a long period. This is an important feature of my invention which is made possible by reason of the fact that the principal reaction, that is, during the addition of the ketone, is effected at a temperature above about 25° C. As already pointed out the reaction, at temperatures above about 25° C., proceeds in a manner such that excessive quantities of the ketone do not accumulate in the reaction mixture. Consequently, after the ketone addition is complete I am able to reflux the reaction mixture without danger of the reaction becoming violent. I am able thusly materially to reduce the time required to complete the reaction. At the same time I avoid the explosion hazard which has characterized the prior art processes. Moreover, and quite surprisingly in view of the shorter reaction time, I obtain markedly superior yields. Under the influence of the higher temperatures obtainable by reflux, a further condensation is effected by the sodium alkoxide formed as a by-product. Thus where the maximum yield reported in the prior art is about 65 per cent I have been able consistently to obtain yields in the order of 88 per cent.

It will be evident, of course, that my invention is primarily concerned with a new and improved procedure for effecting a known condensation reaction, namely, the condensation of a methyl monoketone and a fatty acid ester with metallic sodium. Consequently, those skilled in the art are fully apprised of the wide variety of the methyl monoketones and fatty acid esters which may be condensed according to my processes. Many of the beta-diketones which may be prepared by the Claisen condensation are reported in the literature and many remain yet to be prepared. Nevertheless, the basic nature of the reaction is well understood and it would be mere surplusage to recite all or any of the wide variety of methyl monoketones and fatty acid esters which may be condensed according to my invention. It may be mentioned, however, that the lower boiling point compounds present the major problems due to increased explosion hazards. With low boiling reagents such as acetone, methyl ethyl ketone and ethyl acetate, for example, it has been difficult in the past so to control the reaction that the heat of the reaction does not cause the evolution of vapors with explosive violence. It will be sufficient, therefore, to illustrate my invention with reference to the simpler beta-diketone of the series, namely, 2,4-pentanedione (acetylacetone) and 2,4-hexanedione (propionylacetone).

*Example I*

Into a closed reaction vessel equipped with a mechanical agitator was placed 350 grams of xylene, 46 grams of sodium, and 528 grams of ethyl acetate. Air was swept out of the reaction vessel with nitrogen. With the agitator running there was added 6 grams of acetone and the temperature being maintained at 40° C. of a warm water bath. After the mixture had become orange-yellow, indicating that the reaction had begun, an additional 52 grams of acetone was added gradually over a period of 4 hours, the temperature being maintained at 40° C. After this acetone addition, the mixture was refluxed for ½ hour. To the mixture was then added 400 parts of cold water to dissolve the sodium acetyl-acetone, and the water extract was separated from the mixture by gravitation. The yield on the basis of the monoketone was 88 per cent.

When the same procedure was repeated, but with the omission of the reflux step, I obtained a yield of 73.8 per cent, showing that a substantial increase in yield results from the reflux step. Yet, without reflux I obtained about a 25 per cent increase over the 58 per cent yield recorded by Sprague et al., supra, for the same diketone and with reflux about a 50 per cent increase. Moreover, the time required for the reaction, less than 5 hours, is substantially less than one-third that required to complete the reaction according to the prior art processes.

Other factors which have been observed to effect the yield are the particle size of the sodium, the degree of agitation, the concentration of ethyl acetate, and the solubility of the reaction product in the reaction mixture. Thus improved yields are obtained with finely divided sodium, with a moderate degree of agitation, with a substantial excess of ethyl acetate, for example, about 6 moles for each mole of the ketone, and when the reaction product is soluble in the reaction mixture. In the latter respect the xylene serves a further function in addition to those already mentioned in that it increases the solubility of the reaction product in the reaction mixture.

While the prior art has indicated that it is unsafe to carry out the Claisen condensation in proportions substantially greater than one mole quantities of acetone, I have found that my processes may be carried out safely with much larger quantities. In such cases it is convenient to use a jacketed condensation chamber so that the temperature of the reaction may be controlled by the introduction of steam or cooling water, as required. The following example in which the beta-diketone is recovered as a chelate cupric enolate is illustrative.

Example II

The sodium (2.45 lbs.) required for a 5 lb. batch was pressed out in the form of wire on the small sodium press into 16.4 lbs. of xylene. This mixture was introduced into the condensation chamber through the charging hole. The stirring was begun and 27.75 lbs. of ethyl acetate was added at room temperature. A small portion (0.3 lb.) of methyl ethyl ketone was added and the temperature of the chamber was increased to 40° C. by passage of steam through the outer jacket. The air in the chamber was displaced with nitrogen to provide an inert atmosphere. After a temperature of 40° C. had been reached the steam was removed and a test was made to determine whether the reaction had actually been initiated. This was accomplished by the addition of a small amount of ketone and observation of temperature. Evolution of heat indicated that the condensation had begun. When it had been observed that actual condensation was occurring, the remainder of the ketone (3.52 lbs.) was added over a 4 hour period. The temperature during the condensation was maintained at 40° C. (± 2°) by the adjustment of steam and cooling water through the jacket. The addition of the ketone was followed by an hour of refluxing to dissolve any unreacted sodium and also to complete the condensation of any remaining ketone.

The reaction mixture (50.0 lbs.) was removed to an earthenware crock and treated with 2 gallons of cold water. After settling the water layer was drained off and the aqueous solution of the sodium enolate of 2,4-hexanedione was added to a previously prepared warm solution of copper ammonium sulfate (12%). The copper ammonium sulfate solution had been prepared by heating 4.5 lbs. copper sulfate with 39.0 lbs. water to 65° C. and adding 4.4 lbs. ammonia (26 Bé.). The precipitate, the chelate cupric enolate of 2,4-hexanedione (copper propionylacetonate), was allowed to stand for one hour and then filtered on an earthenware vacuum filter crock. The precipitate was washed with 30 lbs. of water after the filtrate had been tested with copper ammonium sulfate solution for completeness of precipitation. The precipitate was washed until the filtrate retained only a slight blue coloration. The filter cake (73% $H_2O$) was dried in enamelled pans over night in an oven at 105° C. On the basis of the monoketone the yield was 64 per cent as compared with a 48 per cent yield reported by Morgan and Reeves (J. Chemical Society (London) vol. 123, p. 448) for the same compound.

It is to be understood that the foregoing examples are given by way of illustration only and that numerous variations may be made without departing from the spirit of my invention. Thus I may use temperatures other than those specifically mentioned, I may use different proportions of the several reagents; I may use different amounts of xylene, or I may substitute a different inert liquid medium or I may omit the same if desired; I may vary the manner and rate of addition of the ketone; I may use any suitable means for excluding air from the reaction, or I may omit this conventional precaution if desired; I may complete the reaction by refluxing for a suitable period of not as desired, or I may allow the reaction mixture to stand at a suitable temperature for a suitable period; and I may recover the reaction product as the sodium enolate, as a chelate cupric enolate, as the free beta-diketone, or in any suitable manner.

In selecting a proper temperature for carrying out the reaction two factors may be considered. In the first place, the temperature should be selected high enough so that the reaction is not appreciably suppressed; ordinarily, a temperature above about 25° C. will be found suitable tho a temperature about 40° C. is preferred. With some of the higher boiling point compounds it may be desirable to use a somewhat higher temperature. In the second place, the temperature should be selectd with reference to the boiling point of the lowest boiling constituent inclusive of the reaction mixture; preferably, a differential of about 10° C. should be provided to allow for increases due to the heat of the reaction. While this is largely a precautionary measure it is nevertheless of practical importance since, if the temperature is maintained too near the boiling point of the lowest boiling constituent, excessive care and excessively long time is required in making the ketone addition. For example, with acetone I have found that temperatures in the order of 40° C. are most efficacious as at this temperature the reaction can be completed in the shortest time. The temperature of the reaction mixture, of course, may be expected to vary somewhat due to the heat of the reaction. For example, if the reaction mixture is heated to about 40° C. the temperature of the reaction mixture may vary between about 40° C. and about 50° C. This variation may be suppressed and the temperature maintained substantially constant by the use of both heating and cooling means as in Example II. This is of particular advantage when large quantities of reagents are employed because the rate of dissipation of the heat of the reaction is less the greater the quantity of the reaction mixture.

With higher boiling ketones higher temperatures may be used if desired, altho for practical purposes there is little advantage in employing temperatures above about 80° C. If the ketone has a boiling point higher than that of the ester then, of course, the temperature may be selected with reference to the latter. Thus higher temperatures may be employed in the condensation of ethyl methyl ketone and ethyl acetate as described in Example II than in the condensation of acetone and ethyl acetate as in Example I.

It may be noted here that acetone and ethyl propionate yield the same beta-diketone, namely, 2,4-hexanedione, as ethyl methyl ketone and ethyl acetate. Consequently, by properly selecting the reagents the boiling point of the lowest boiling constituent may be varied considerably and may be selected with reference to the particular temperature at which it is desired to carry out the reaction.

The optimum proportion for the several reagents in carrying out my processes does not differ essentially from that previously determined in the prior art. Figured on the basis of the ketone the sodium is preferably employed in approximately stoichiometrical amounts, tho larger amounts will give slightly improved yield, and the fatty acid ester in substantial excess. For each mole of ketone at least 2 moles (gram atoms) of sodium and at least 3 moles of the fatty acid ester should be employed. Preferably the ester is used in greater excess, 6 moles of the ester to each mole of the ketone ordinarily being more desirable. It will be understood, however, that these proportions are critical only insofar as they affect the yield of the diketone, and that as far as the condensation reaction proper is concerned any proportions may be employed.

I am aware that some authorities hold that a trace of alcohol is essential to the condensation. Be this as it may, it is only of theoretical interest since a trace of alcohol will invariably be present.

While I have given xylene as a suitable inert liquid medium it is evident that other materials may be employed. Di-isopropyl ether, toluene, butyl ether, and amyl ether may be mentioned as further examples. Likewise, an excess of the fatty acid ester will serve the same purpose. The use of inert liquids as reaction mediums is well known in the prior art and, consequently, I do not limit myself to any particular type of inert liquid. In my processes, however, the inert liquid medium serves a new and important function in acting as a reservoir to absorb the heat of reaction, and for this purpose I prefer that the inert liquid medium constitute at least about 40 per cent by volume of the reaction mixture or that it be used in such amounts that the initial reaction mixture, that is, the fatty acid ester plus the inert liquid medium, shall have a volume at least about 12 times the volume of ketone added.

The efficacy of the inert liquid medium also depends to a large extent upon its solvent action on the reagents and the reaction product. Preferably it should be a solvent for both the sodium enolate and the sodium alkoxide formed. Desirably it should be a solvent for at least one of these materials since otherwise the mixture tends to thicken and the condensation reaction is retarded.

To initiate the reaction a certain period of induction is required. This will depend upon the nature of the reagents employed and the temperature. Since the reaction proceeds very rapidly once initiated it is important that the amount of ketone added initially be limited. Otherwise, unless precautions are taken immediately to cool the reaction mixture once the reaction is initiated, the reaction may proceed with explosive violence. Having in mind these considerations those skilled in the art will be able readily to determine the amount of the initial ketone addition suitable for carrying out the reaction at a temperature above about 25° C. As a rule, however, I have found that it will be sufficient if the amount of the initial ketone addition is limited to less than about 10 per cent of the total ketone required. Suitably, from 5 to 10 per cent may be used.

Once reaction has been initiated, as may readily be determined by the evolution of heat or changes in the reaction mixture, for example, the color of the reaction mixture may change or a precipitate may form, depending upon the nature of the reagents, then addition of the remainder of the ketone may be started. Having reference to the fact that the reaction mixture is maintained at a temperature above about 25° C. thruout, those skilled in the art will readily be able to determine the optimum rate of addition. As a rule it will be sufficient if the balance of the ketone is added at a rate not substantially greater than about 25 per cent per hour, figured on the basis of the total ketone added. It is to be understood, however, that I do not limit myself to any particular rate of addition since numerous factors such as the temperature at which the reaction is carried out, the nature of the reagents, and the amount of inert liquid medium will all have to be considered in determining the proper rate. Having these factors in mind those skilled in the art will be able to determine a suitable rate to prevent the reaction from proceeding with explosive violence.

As a final step in the condensation I prefer to reflux the reaction mixture for a period of at least twenty minutes. This, as already noted, is made possible by reason of the fact that the principal reaction is carried out at a temperature above about 25° C. and has the effect of materially reducing the overall time required for completing the reaction. It also materially increases the yield. In carrying out the reaction during the addition of the ketone it is desirable to maintain the reaction mixture at a temperature below about 10° C. below the boiling point of the lowest boiling constituent. This, as already pointed out, makes the rate of addition of the ketone less critical and permits the ketone to be added at a faster rate than would be possible if the temperatures were nearer the boiling point of the reaction mixture. Once the ketone addition is complete, however, higher temperatures may conveniently be used. Temperatures at the boiling point of the reaction mixture as may best be obtained by refluxing will ordinarily be found most suitable, particularly where low boiling reagents such as acetone are employed. Other temperatures may be employed but in general it will be found desirable to complete reaction at a temperature above that at which the principal reaction is carried out, since it appears that the sodium alkoxide which is then available as the condensing agent is more effective at higher temperatures.

Once the reaction is complete the reaction product may be recovered in any suitable manner. It may be recovered as such, that is, as the sodium enolate of the beta-diketone, or it may be converted to the beta-diketone by means of a suitable acid such as acetic acid and recovered as the beta-diketone itself. Either the sodium enolate or the free beta-diketone may be converted into the corresponding chelate cupric enolate in the manner described in Example II. However recovered the beta-diketone or its sodium enolate is useful for various purposes but is particularly useful as intermediates in preparing other metallic derivatives such as chelate cupric enolates.

Since many apparently widely differing embodiments of my invention may be made it is to be understood that such variations as do not depart from the spirit and scope of my invention are intended to be included within the scope of the following claims.

I claim:

1. The method which comprises condensing a methyl monoketone selected from the class consisting of methyl ethyl ketone and acetone and a fatty acid ester with metallic sodium while maintaining a reaction temperature above 25° C. throughout the entirety of the reaction.

2. The method which comprises condensing a methyl monoketone selected from the class consisting of methyl ethyl ketone and acetone and a fatty acid ester with metallic sodium while maintaining a reaction temperature above 25° C. but below the boiling point of the reaction mixture throughout the entirety of the reaction.

3. The method which comprises condensing a methyl monoketone selected from the class consisting of methyl ethyl ketone and acetone and ethyl acetate with metallic sodium while maintaining the reaction temperature between about 25° C. and about 65° C. throughout the entirety of the reaction.

4. The method which comprises condensing acetone and a fatty acid ester with metallic sodium while maintaining a reaction temperature between about 25° C. and about 45° C. throughout the entirety of the reaction.

5. The method which comprises condensing a methyl monoketone selected from the class consisting of methyl ethyl ketone and acetone and a fatty acid ester with metallic sodium while maintaining a reaction temperature above 25° C. but below the boiling point of the reaction mixture throughout the entirety of the reaction and completing the reaction under reflux.

6. The method which comprises condensing a methyl monoketone selected from the class consisting of methyl ethyl ketone and acetone and ethyl acetate with metallic sodium while maintaining the reaction temperature between about 25° C. and about 65° C. throughout the entirety of the reaction and completing the reaction under reflux.

7. The method which comprises condensing acetone and a fatty acid ester with metallic sodium while maintaining a reaction temperature between about 25° C. and about 45° C. throughout the entirety of the reaction and completing the reaction under reflux.

8. The method which comprises contacting a fatty acid ester with metallic sodium under an inert liquid and gradually adding a methyl monoketone while maintaining a reaction temperature between about 10° C. below the boiling point of the lowest boiling constituent and about 25° C.

9. The method which comprises contacting ethyl acetate with metallic sodium under an inert liquid and gradually adding a methyl monoketone while maintaining a reaction temperature between about 25° C. and about 65° C.

10. The method which comprises contacting a fatty acid ester with metallic sodium under an inert liquid and gradually adding a methyl monoketone while maintaining a reaction temperature between about 25° C. and about 45° C.

11. The method which comprises contacting a fatty acid ester with metallic sodium under an inert liquid, gradually adding a methyl monoketone while maintaining a reaction temperature between about 10° C. below the boiling point of the lowest boiling constituent and about 25° C., and then heating the reaction mixture under reflux.

12. The method which comprises contacting ethyl acetate with metallic sodium under an inert liquid, gradually adding a methyl monoketone while maintaining a reaction temperature between about 25° C. and about 65° C., and then heating the reaction mixture under reflux.

13. The method which comprises contacting a fatty acid ester with metallic sodium under an inert liquid, gradually adding a methyl monoketone while maintaining a reaction temperature between about 25° C. and about 45° C., and then heating the reaction mixture under reflux.

14. In the preparation of sodium enolates of beta-diketones by the condensation of a methyl monoketone and a fatty acid ester with metallic sodium in proportions such that the molal ratio of ester to ketone is at least 3:1 and the molal ratio of sodium to ketone is at least 2:1, the process which comprises contacting the ester with metallic sodium under an inert liquid medium, adding a portion of the ketone but less than about 10 per cent of the total ketone required, heating the reaction mixture to initiate reaction, and thereafter gradually adding the balance of the ketone while maintaining a reaction temperature between about 10° C. below the boiling point of the lowest boiling constituent and about 25° C.

15. In the preparation of sodium enolates of beta-diketones by the condensation of a methyl monoketone and a fatty acid ester with metallic sodium in proportions such that the molal ratio of ester to ketone is at least 3:1 and the molal ratio of sodium to ketone is at least 2:1, the process which comprises contacting the ester with metallic sodium under an inert liquid medium, adding a portion of the ketone but less than about 10 per cent of the total ketone required, heating the reaction mixture to initiate reaction, thereafter gradually adding the balance of the ketone while maintaining a reaction temperature between about 10° C. below the boiling point of the lowest boiling constituent and about 25° C., and then heating the reaction mixture under reflux.

16. In the preparation of sodium enolates of 2,4-beta-diketone by the condensation of a methyl monoketone and ethyl acetate with metallic sodium in proportions such that the molal ratio of ester to ketone is at least 3:1 and the molal ratio of sodium to ketone is at least 2:1, the process which comprises contacting the ester with metallic sodium under an inert liquid medium, adding about 5 to 10 per cent of the total ketone required, heating the reaction mixture to initiate the reaction, and while maintaining the reaction mixture at a temperature between about 25° C. to 65° C. adding the balance of the ketone at a rate not substantially in excess of about 25 per cent per hour figured on the total ketone required.

17. In the preparation of sodium enolates of 2,4-beta-diketone by the condensation of a methyl monoketone and ethyl acetate with metallic sodium in proportions such that the molal ratio of ester to ketone is at least 3:1 and the molal ratio of sodium to ketone is at least 2:1, the process which comprises contacting the ester with metallic sodium under an inert liquid medium, adding about 5 to 10 per cent of the total ketone required, heating the reaction mixture to initiate the reaction and while maintaining the reaction mixture at a temperature between about 25° C. to 65° C. adding the balance of the ketone at a rate not substantially in excess of about 25 per cent per hour figured on the total ketone required, and then heating the reaction mixture under reflux.

18. In the preparation of sodium enolates of 2,4-beta-diketone by the condensation of acetone and a fatty acid ester with metallic sodium in proportions such that the molal ratio of ester to acetone is at least 3:1 and the molal ratio of sodium to acetone is at least 2:1, the process which comprises contacting the ester with metallic sodium under an inert liquid medium, adding about 5 to 10 per cent of the total acetone required, heating the reaction mixture to initiate the reaction, and while maintaining the reaction mixture at a temperature between about 25° C. to 45° C. adding the balance of the acetone at a rate not substantially in excess of about 25 per cent per hour figured on the total acetone required.

19. In the preparation of sodium enolates of 2,4-beta-diketone by the condensation of acetone and a fatty acid ester with metallic sodium in proportions such that the molal ratio of ester to acetone is at least 3:1 and the molal ratio of sodium to acetone is at least 2:1, the process which comprises contacting the ester with metallic sodium under an inert liquid medium, adding about 5 to 10 per cent of the total acetone required, heating the reaction mixture to initiate the reaction and while maintaining the reaction mixture at a temperature between about 25° C. to 45° C. adding the balance of the acetone at a rate not substantially in excess of about 25 per cent per hour figured on the total acetone required, and then heating the reaction mixture under reflux.

20. In the manufacture of beta-diketones from methyl monoketones and fatty acid esters which react vigorously in the presence of metallic sodium at temperatures above about 25° C. the method which comprises gradually adding one reagent while maintaining a reaction temperature above 25° C.

CHARLES J. KRISTER.

CERTIFICATE OF CORRECTION.

Patent No. 2,240,934. May 6, 1941.

CHARLES J. KRISTER.

It is hereby certified that error appears in the printed specification of the above numbered patent requiring correction as follows: Page 2, second column, line 41, Example I, strike out the words "being maintained at 40° C." and insert instead --was raised to 40° C. by means--; page 3, second column, line 13, for "of" read --or--; and that the said Letters Patent should be read with this correction therein that the same may conform to the record of the case in the Patent Office.

Signed and sealed this 15th day of July, A. D. 1941.

(Seal)

Henry Van Arsdale,
Acting Commissioner of Patents.